(12) United States Patent
Scholz et al.

(10) Patent No.: US 11,657,308 B2
(45) Date of Patent: May 23, 2023

(54) RULE SCENARIO FRAMEWORK FOR DEFINING RULES FOR OPERATING ON DATA OBJECTS

(71) Applicant: SAP SE, Walldorf (DE)

(72) Inventors: Martin Scholz, Nussloch (DE); Bernhard Thimmel, Edingen-Neckarhausen (DE); Johannes Fenzl, Rauenberg (DE); Tobias Poeppke, Oestringen (DE); Heike Klews, Walldorf (DE); Qian Liu, Shanghai (CN)

(73) Assignee: SAP SE, Walldorf (DE)

(*) Notice: Subject to any disclaimer, the term of this patent is extended or adjusted under 35 U.S.C. 154(b) by 694 days.

(21) Appl. No.: 16/025,923

(22) Filed: Jul. 2, 2018

(65) Prior Publication Data

US 2020/0005174 A1 Jan. 2, 2020

(51) Int. Cl.
*G06F 3/04847* (2022.01)
*G06N 5/046* (2023.01)

(52) U.S. Cl.
CPC ......... *G06N 5/046* (2013.01); *G06F 3/04847* (2013.01)

(58) Field of Classification Search
CPC .............................. G06N 5/046; G06F 3/04847
See application file for complete search history.

(56) References Cited

U.S. PATENT DOCUMENTS

| | | | | |
|---|---|---|---|---|
| 5,917,489 A * | 6/1999 | Thurlow | ............... | G06Q 10/107 715/809 |
| 10,264,214 B1 * | 4/2019 | Kumar | ................... | H04M 3/28 |
| 2009/0089132 A1 * | 4/2009 | Nallapaty | ............ | G06Q 10/105 705/320 |
| 2014/0038489 A1 * | 2/2014 | Sharma | .................... | A63H 3/28 446/175 |
| 2015/0082197 A1 * | 3/2015 | Pearl | ....................... | G06F 3/048 715/753 |
| 2017/0255866 A1 * | 9/2017 | Lambe | .................... | G06F 16/21 |
| 2018/0102048 A1 * | 4/2018 | Greene | .................. | G08C 17/02 |

OTHER PUBLICATIONS

Florin, Enhance Windows Speech Recognition by Using Macros, Mar. 22, 2009, https://www.wintuts.com/enhance-windows-speech-recognition-using-macros, pp. 1-18 (Year: 2009).*

* cited by examiner

*Primary Examiner* — Jennifer N Welch
*Assistant Examiner* — Ashley M Fortino
(74) *Attorney, Agent, or Firm* — Mintz Levin Cohn Ferris Glovsky and Popeo, P.C.

(57) ABSTRACT

A method may include generating a first user interface for providing, to a client, a first selection of inputs for attributes of a rule scenario for defining a rule. The rule may be applied to modify a data processing functionality of the application. Parameters of the rule may be determined based on the rule scenario and a first input from the first selection of inputs being selected via the first user interface. The parameters of the rule may correspond to data objects affected by the application of the rule. A second user interface for providing, to the client, a second selection of inputs for defining a condition of the rule may be generated. The condition of the rule may evaluate the parameters of the rule. The rule may be generated based on a second input from the second selection of inputs being selected via the second user interface.

18 Claims, 6 Drawing Sheets

RULE SCENARIO FRAMEWORK FOR DEFINING RULES FOR OPERATING ON DATA OBJECTS

TECHNICAL FIELD

The subject matter described herein relates generally to data processing and, more specifically, to a rule scenario framework for defining rules for operating on data objects.

BACKGROUND

An application may provide various data processing functionalities including, for example, payroll, time and attendance management, recruiting and onboarding, learning and development, performance and compensation, workforce planning, and/or the like. Furthermore, the application may support multitenancy and be a shared software resource that is remotely accessible to multiple tenants, for example, over the Internet. For example, the application may be available to multiple tenants as a cloud-based service such as, for example, a software as a service (SaaS) and/or the like. As such, the data processing functionalities of the application may be required to accommodate use cases that are specific to each individual tenant.

SUMMARY

Systems, methods, and articles of manufacture, including computer program products, are provided for defining a rule in accordance with a rule scenario. In one aspect, there is provided a system. The system may include at least one data processor and at least one memory. The at least one memory may store instructions that result in operations when executed by the at least one data processor. The operations may include: generating a first user interface for providing, to a client, a first selection of inputs for one or more attributes of a rule scenario for defining a rule, the rule being applied by an application to modify a data processing functionality of the application; determining, based at least on the rule scenario and a first input from the first selection of inputs being selected via the first user interface, one or more parameters of the rule, the one or more parameters of the rule corresponding to one or more data objects affected by the application of the rule; generating, based at least on the one or more parameters of the rule, a second user interface for providing, to the client, a second selection of inputs for defining a condition of the rule, the condition of the rule evaluating the one or more parameters of the rule; and generating, based at least on a second input from the second selection of inputs being selected via the second user interface, the rule.

In some variations, one or more features disclosed herein including the following features may optionally be included in any feasible combination. The application of the rule may return a Boolean value determined based at least on the evaluation of the one or more parameters of the rule.

In some variations, the first selection of inputs and the second selection of inputs are determined based at least on the rule scenario. The first selection of inputs and the second selection of inputs may exclude impermissible data objects that are not permitted to be affected by the application of the rule.

In some variations, the second user interface may further provide, to the client, a third selection of inputs for defining an action that is triggered based at least on the evaluation of the one or more parameters of the rule. The third selection of inputs may be determined based at least on the rule scenario and/or the first selection of inputs. The third selection of inputs may exclude impermissible actions that are not permitted to be performed on the one or more data objects corresponding to the one or more parameters of the rule. The impermissible actions may be determined based on restrictions on a reading of values and/or a writing of values from the one or more data objects corresponding to the one or more parameters of the rule.

In some variations, the application of the rule may modify the data processing functionality of the application in accordance with a use case associated with the client.

In some variations, the first user interface may be generated in response to a selection of the rule scenario from a plurality of rule scenarios.

In some variations, the application may be a cloud-based service. The client may access the data processing functionality of the application remotely. The client may be a tenant of the cloud-based service. The rule may be applied when another client comprising the tenant of the cloud-based service invokes the data processing functionality of the application.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

In the drawings.

When practical, similar reference numbers denote similar structures, features, or elements.

DETAILED DESCRIPTION

An application may operate on one or more data objects in order to perform a data processing functionality including, for example, payroll, time and attendance management, recruiting and onboarding, learning and development, performance and compensation, workforce planning, and/or the like. When deployed as a cloud-based service, the data processing functionality of the application may be configured to accommodate uses cases that are specific to each individual tenant with access to the application. For example, a tenant may define, via a rule framework, one or more rules including, for example, a validation rule, a propagation rule, a conditional action rule, a condition rule, and/or the like. The application may apply these rules when operating on one or more data objects to perform the data processing functionality, thereby modifying and/or extending the data processing functionality to accommodate one or more tenant specific use cases. However, the tenant may define a defective rule because a conventional rule framework does not impose necessary restrictions on the scope of the rule defined by the tenant including, for example, the data objects affected by the rule, the actions triggered by the rule, and/or the like. Unexpected and/or unresolvable errors may arise when the application applies a defective rule while operating on one or more data objects.

In some example embodiments, a rule scenario controller may provide a rule scenario framework for a tenant of an application to define one or more rules, which may be applied to modify the data processing functionalities of the application. Under the rule scenario framework, a rule may be defined in accordance with a rule scenario that imposes the necessary restrictions on the scope of the rule. For example, the rule scenario controller may generate, based on the rule scenario, one or more user interfaces for defining a rule that limits the input from the tenant to exclude, for example, impermissible data objects, impermissible actions, and/or the like. Alternatively and/or additionally, the rule scenario may restrict access to one or more system generated context parameters. In doing so, the tenant may be prevented from defining the rule to affect impermissible data objects, trigger impermissible actions, and/or the like. Accordingly, a rule that is defined in accordance with the rule scenario may be applied while the application performs one or more data processing functionalities without giving rise to unexpected and/or unresolvable errors.

Figure 1:
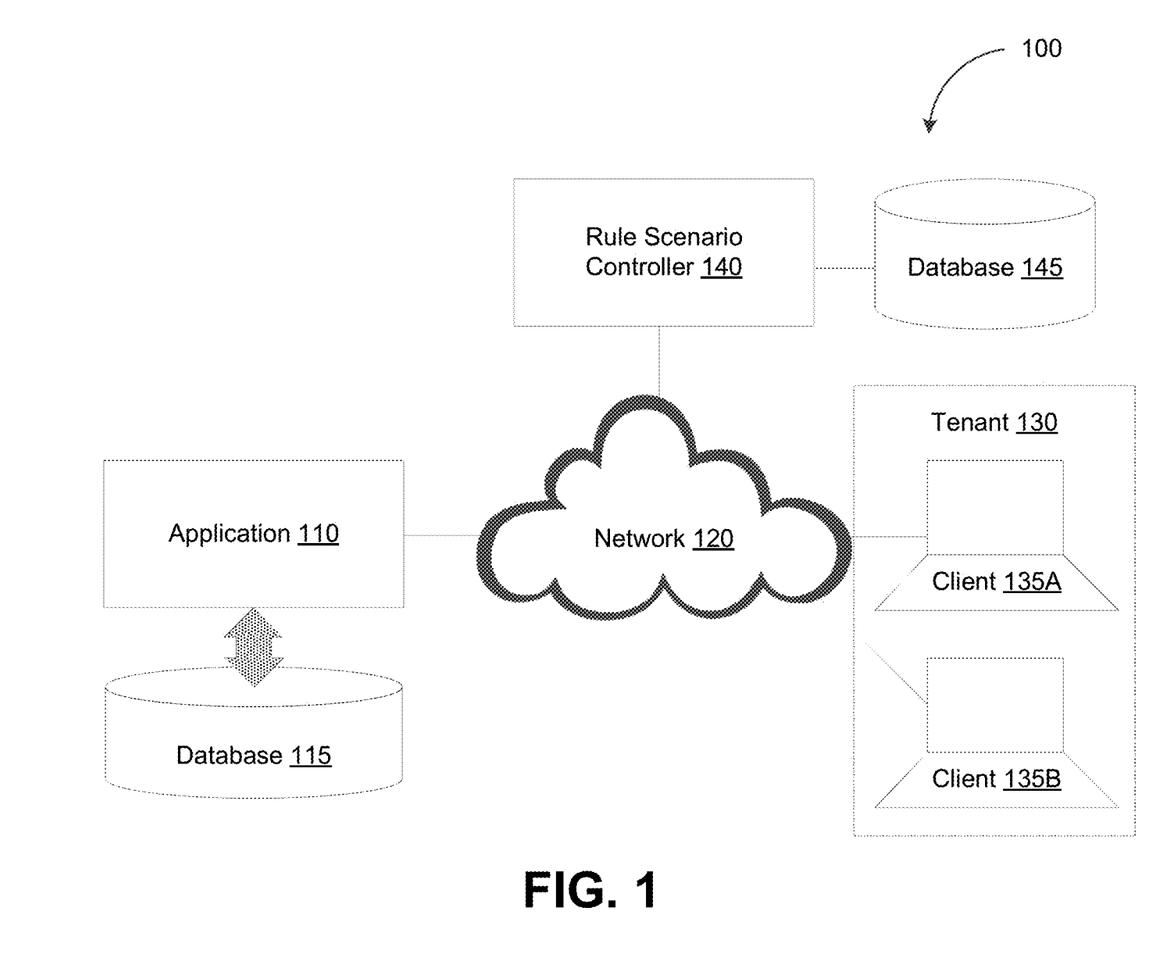
FIG. 1 depicts a system diagram illustrating a cloud computing system, in accordance with some example embodiments.

FIG. 1 depicts a system diagram illustrating a cloud computing system 100 consistent with implementations of the current subject matter. Referring to FIG. 1, the cloud computing system 100 may include an application 110, which may be a cloud-based service (e.g., a software as a service (SaaS)) serving one or more tenants including, for example, a tenant 130 and/or the like. As used herein, a tenant may refer to a group of clients in the cloud computing system 100 who share common access privileges to the application 110. For instance, the tenant 130 may include a first client 135A and a second client 135B, which share common access privileges to the application 110. As shown in FIG. 1, the first client 135A and/or the second client 135B may access the application 110 via a network 120, which may be any wired and/or wireless network including, for example, a public land mobile network (PLMN), a local area network (LAN), a virtual local area network (VLAN), a wide area network (WAN), the Internet, and/or the like. The first client 135A and/or the second client 135B can be any processor-based device capable of wired and/or wireless communication including, for example, a mobile telephone, a laptop computer, a desktop, a netbook, a tablet, a smartphone, a wearable apparatus (e.g., smartwatch), and/or the like.

In some example embodiments, the application 110 may provide one or more data processing functionalities including, for example, payroll, time and attendance management, recruiting and onboarding, learning and development, performance and compensation, workforce planning, and/or the like. Performing a data processing operation may require the application 110 to operate on one or more data objects stored, for example, in a database 115. For instance, in order to perform a data processing operation, the application 110 may store a new data object in the database 115 and/or modify an existing data object in the database 115. It should be appreciated that the database 115 may be any type of persistence including, for example, an in-memory database, a hierarchical database, an object database, an object-relational database, a non-Structured Query Language (NoSQL) database, and/or the like. For example, the database 115 may be a relational database, a graph database, a column store, a key-value store, a document store, and/or the like.

Referring again to FIG. 1, the application 110 may be required to accommodate use cases that are specific to an individual tenant such as, for example, the tenant 130. For example, the first client 135A may, as an administrator for the tenant 130, define one or more rules. Application of these rules may modify a data processing functionality of the application 110 to accommodate a use case that is specific to the tenant 130. For example, the second client 135B may, as an end user within the tenant 130, invoke the data processing functionality of the application 110. The application 110 may perform the data processing functionality invoked by the second client 135B which, as noted, may require the application 110 to operate on one or more data objects stored in the database 115. Furthermore, in some example embodiments, the application 110 may apply the rules defined by the first client 135A while performing the data processing functionality. In doing so, the application 110 may extend and/or modify the data processing functionality to accommodate the use case specific to the tenant 130.

It should be appreciated that the rules defined by the first client 135A may be a validation rule, a propagation rule, a conditional action rule, a condition rule, and/or the like. As used herein, a validation rule may validate a data object and trigger an error message and/or terminate an executing data processing functionality in the event the data object contains erroneous values. A propagation rule may prepopulate a data object with one or more values. Alternatively and/or additionally, a conditional action rule may trigger an action based on a status of a data object whereas a condition rule may return a Boolean value (e.g., true and/or false) based on the status of the data object.

For example, the first client 135A may, as the administrator of the tenant 130, define a rule to modify a data processing functionality that updates a data object stored in the database 115. In accordance with the use case specific to the tenant 130, updating the data object may include generating a new data object that inherits at least some values from the original data object and updating the values of the new data object without overwriting any values in the original data object. As such, a rule scenario may specify that the original data object as being read-only and the new data object as being editable. Furthermore, the rule scenario may specify that values from the original data object are to be propagated to the new data object. The application 110 may apply rules generated in accordance with the rule scenario when the application 110 performs the data processing functionality, for example, in response to the data processing functionality being invoked by the second client 135B. Applying the rule may modify the data processing functionality in accordance with the use case specific to the tenant 130 such that updating a data object stored in the database 115 does not overwrite any values in the original data object but instead applies the updates to a new data object.

In some example embodiments, any number of rule scenarios may be developed for the application 110, for example, by implementing a rule scenario interface (e.g., AbstractRuleScenario) and marking the implementing class with an annotation (e.g., RuleScenarioImplementation and/or the like). These rule scenarios may be identified and stored in an index file (e.g., gas.xml and/or the like).

In some example embodiments, the cloud computing system 100 may include a rule scenario controller 140 configured to provide a rule scenario framework for defining one or more rules. For instance, the rule scenario controller 140 may, at runtime, collect all available rule scenarios by at least reading the index file (e.g., gas.xml and/or the like). The index file may be stored, for example, in a database 145 coupled with the rule scenario controller 140. Under the rule scenario framework, a rule may be defined in accordance with a rule scenario that imposes one or more restrictions on the scope of the rule including, for example, the data objects affected by the rule, the events triggered by the rule, and/or the like. For example, the rule scenario controller 140 may generate, based at least on a rule scenario, a user interface, which may be displayed at the first client 135A. According to some example embodiments, the user interface may limit inputs from the first client 135A. For instance, the user interface may provide a selection of inputs for defining the rule that excludes, for example, impermissible data objects, impermissible actions, and/or the like. In doing so, the rule scenario controller 140 may prevent the first client 135A from defining a defective rule that, for example, affects impermissible data objects, triggers impermissible actions, and/or the like.

Figure 2:
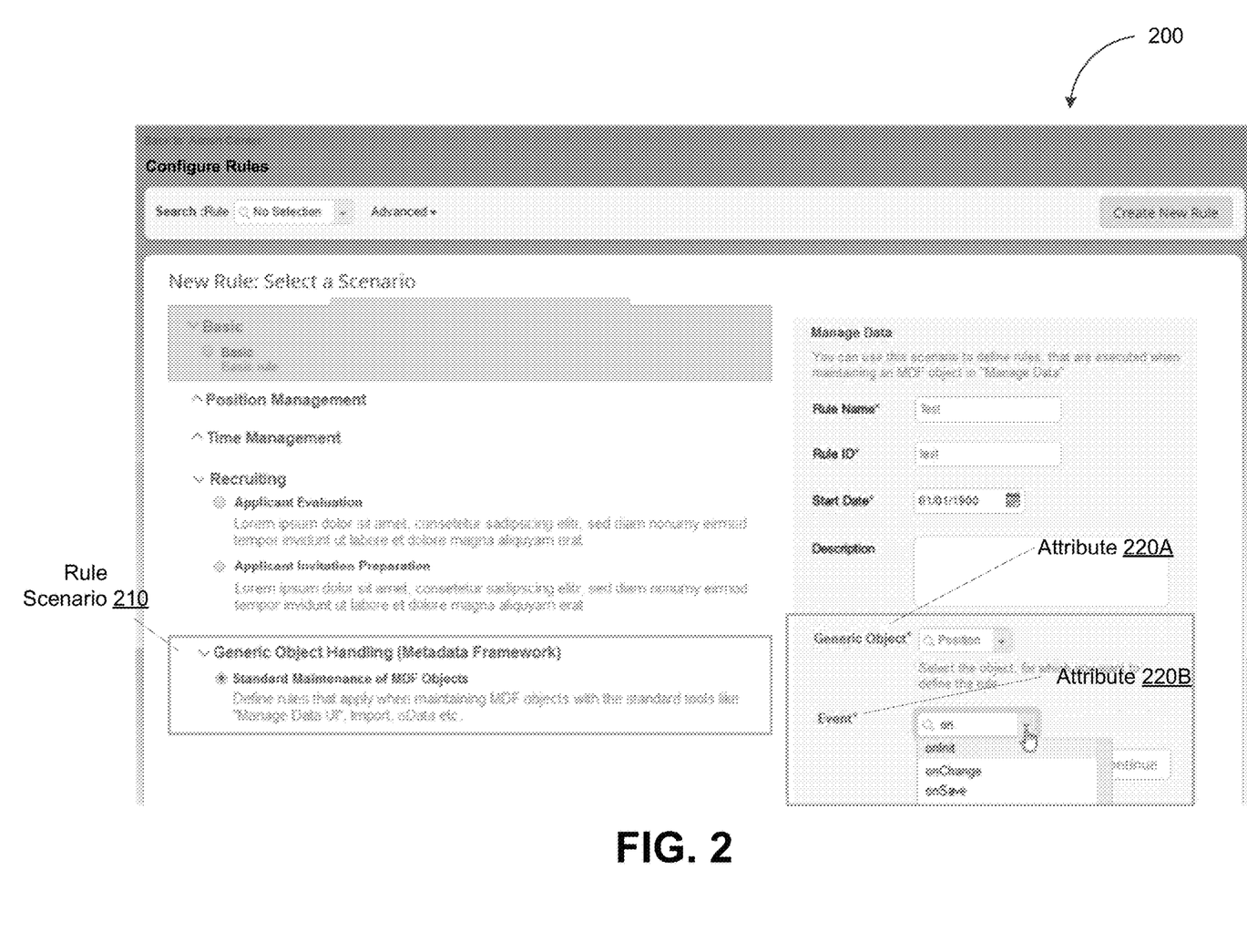
FIG. 2 depicts a user interface for defining a rule based on a rule scenario, in accordance with some example embodiments.

To further illustrate, FIG. 2 depicts a user interface 200 for defining a rule based on a rule scenario, in accordance with some example embodiments. Referring to FIG. 2, the user interface 200 may include a selection of rule scenarios including, for example, a rule scenario 210 for "Standard Maintenance of MDF Objects." As shown in FIG. 2, the rule scenario 210 may be used to define rules that apply to a data processing functionality for maintaining data objects with standard tools including, for example, "Manage Data UI," Import, oData, and/or the like. Thus, to define a rule to extend and/or modify the data processing functionality for maintaining data objects with standard tools, the first client 135A may select, via the user interface 200, the rule scenario 210.

The selection of the rule scenario 210 may be an indication that the first client 135A wish to define a rule in accordance with the rule scenario 210 for "Standard Maintenance of MDF Objects." As shown in FIG. 2, the selection of the rule scenario 210 may cause the user interface 200 to be updated to display one or more input selections for the attributes of the rule scenario 210. Accordingly, to define a rule in accordance with the rule scenario 210, the first client 135A may further select, via the user interface 200, inputs for one or more attributes associated with the rule scenario 210 including, for example, a first attribute 220A, a second attribute 220B, and/or the like. For instance, the first attribute 220A may correspond to one or more data objects affected by the rule defined in accordance with the rule scenario 210. Meanwhile, the second attribute 220B may correspond to events that trigger the rule defined in accordance with the rule scenario 210. Although FIG. 2 shows the rule scenario 210 as being associated with multiple attributes, it should be appreciated that the rule scenario 210 may, in some instances, not be associated with any attributes.

As noted, the user interface 200 may be generated to enforce one or more rule scenarios including, for example, the rule scenario 210. For example, in some example embodiments, the user interface 200 may limit the inputs that may be entered via the user interface 200 by at least providing a selection of inputs that excludes, for example, impermissible data objects, impermissible actions, and/or the like. For example, as shown in FIG. 2, the user interface 200 may provide a selection of inputs for the first attribute 220A that includes one or more data objects such as, for example, the data object "Position," which may be affected by the rule defined in accordance with the rule scenario 210. The selection of inputs for the first attribute 220A may exclude impermissible data objects that the application 110 may not operate on when performing the data processing functionality for maintaining data objects with standard tools. Accordingly, the user interface 200 may prevent the first client 135A from defining a rule that affects impermissible data objects.

Alternatively and/or additionally, the user interface 200 may provide a selection of inputs for the second attribute 220A that specify what events trigger the rule defined in accordance with the rule scenario 210. For instance, the rule may be triggered by one or more interactions with the data object (e.g., the data object "Position") affected by the rule which, as noted, may be specified by the inputs for the first attribute 220A. These interactions may include, for example, the initialization (e.g., "onInit"), the changing (e.g., "onChange"), and/or the saving (e.g., "onSave") of the data object. Furthermore, these interactions may exclude events that should not trigger the rule defined in accordance with the rule scenario 210 such as, for example, the validation (e.g., "onValidate"), the post saving (e.g., "onPostSave"), the save alert (e.g., saveAlert), and/or the deletion (e.g., "delete") of the data object. It should be appreciated that the selection of inputs for the second attribute 220B may correspond to the input for the first attribute 220A. That is, the events that trigger the rule defined in accordance with the rule scenario 210 may change based on the data object affected by the rule.

Figure 3A:
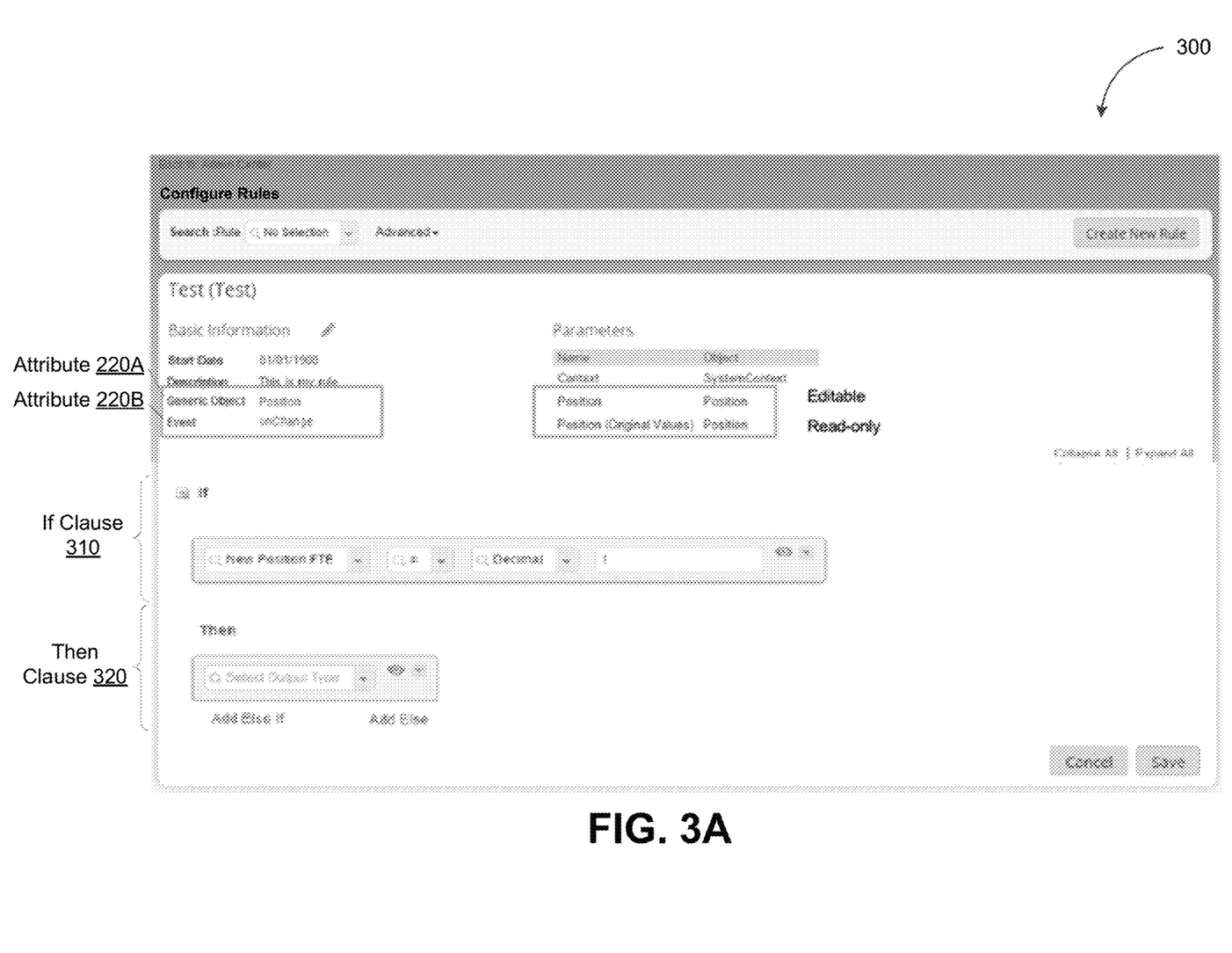
FIG. 3A depicts a user interface for defining a rule based on a rule scenario, in accordance with some example embodiments.
Figure 3B:
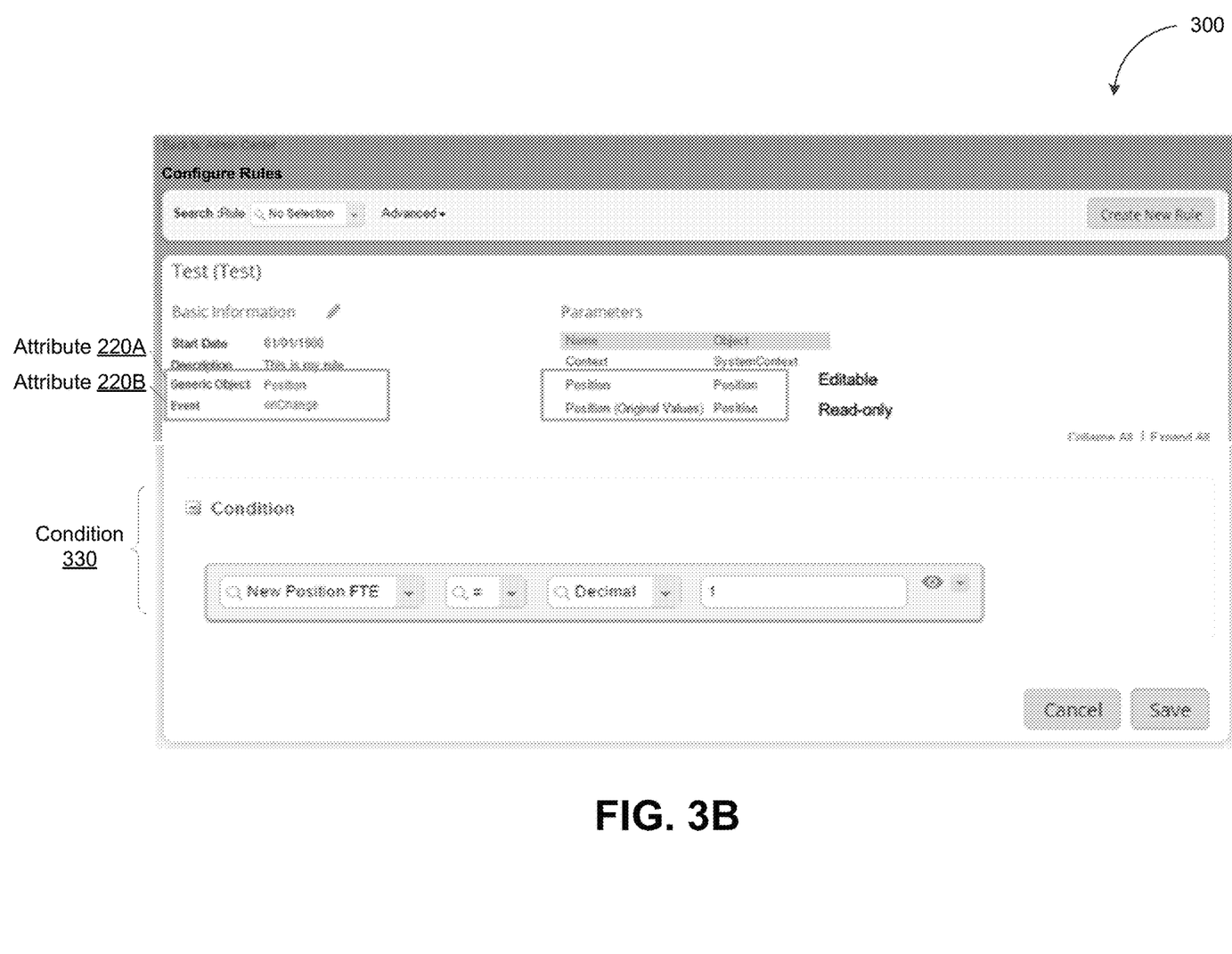
FIG. 3B depicts a user interface for defining a rule based on a rule scenario, in accordance with some example embodiments.

In some example embodiments, the rule scenario controller 140 may generate another user interface based on the selection of the rule scenario 210, the inputs for the first attribute 220A, and/or the inputs for the second attribute 220B. To further illustrate, FIGS. 3A-B depicts a user interface 300, in accordance with some example embodiments. The rule scenario controller 140 may generate the user interface 300 based on the selection of the rule scenario 210, the inputs for the first attribute 220A, and/or the inputs for the second attribute 220B, which may be received via the user interface 200. For example, FIGS. 3A-B shows that the first client 135A may have selected the data object "Position" as an input for the first attribute 220A such that the rule defined in accordance with the rule scenario 210 affects the data object "Position." Alternatively and/or additionally, the first client 135B may have selected the input "onChange" for the second attribute 220B such that the rule is triggered in response to a change to the data object "Position."

Referring again to FIGS. 3A-B, the user interface 300 may display one or more parameters for the rule defined in accordance with the rule scenario 210. In some example embodiments, the parameters of the rule may be determined based at least on the inputs for the first attribute 220A (e.g., the data object "Position") and/or the inputs for the second attribute 220B (e.g., the event "onChange"). For example, the parameters of the rule may correspond to the data objects affected by the rule including, for example, a new "Position" data object, an original "Position" data object, and/or the like. Furthermore, the user interface 300 may display metadata associated with each parameter of the rule including, for example, restrictions on access to the corresponding data objects. For instance, as shown in FIGS. 3A-B, the new "Position" data object may be editable but the original "Position" data object may be read-only. As such, the application 110 applying the rule defined in accordance with the rule scenario 210 may change the values in the new "Position" data object but not the values in the original "Position" data object.

In some example embodiments, the first client 135A may define, via the user interface 300, the rule as a conditional action rule that triggers an action based on the status of a data object affected by the rule. As noted, the data objects affected by the rule may correspond to the parameters of the rule including, for example, the values of the new "Position" data object, the values of the original "Position" data object, and/or the like. To further illustrate, FIG. 3A depicts an example of the user interface 300 configured to receive inputs for defining a conditional action rule. As shown in FIG. 3A, the user interface 300 may include one or more input fields for constructing the clauses of the conditional action rule including, for example, an if clause 310, a then clause 320, and/or the like. It should be appreciated that the conditional action rule may include multiple if clauses (e.g., "else if" clauses) and/or then clauses (e.g., "else" clauses).

In some example embodiments, the if clause 310 of the conditional action rule may specify a condition for triggering the action specified in the then clause 320 of the conditional action rule. For example, as shown in FIG. 3A, the if clause 310 of the conditional action rule may specify a condition for the full time equivalent (FTE) value of a new position data object to equal to 1. Meanwhile, the then clause 320 of the conditional action rule may specify an action that is performed when the full time equivalent (FTE) value of a new position data object is determined to be equal to 1.

According to some example embodiments, the rule scenario 210 may prohibit the creation of conditional action rule in which the condition is always true. As such, the rule scenario controller 140 may, in accordance with the rule scenario 210, require an input for the if clause 310.

According to some example embodiments, the selection of inputs available for constructing the if clause 310 of the conditional action rule may be determined based on the data objects affected by the rule including, for example, the new "Position" data object, the original "Position" data object, and/or the like. For instance, the selection of values that may be evaluated by the if clause 310 may correspond to the values in the "Position" data object. Alternatively and/or additionally, the selection of evaluation operations may correspond to the data types of the values in the "Position" data object. For example, FIG. 3A shows that the if clause 310 of the conditional action rule may specify a condition for the full time equivalent (FTE) value of a new position data object to be equal to a decimal value of 1. The full time equivalent (FTE) value may be part of a selection of inputs for the if clause 310 based at least on the full time equivalent (FTE) value being a part of the "Position" data object. Moreover, the equals operation may be part of a selection of evaluation operations based at least on the data type of the full time equivalent (FTE) value being a numerical (e.g., decimal) value.

According to some example embodiments, the rule scenario controller 140 may impose, in accordance with the rule scenario 210, one or more restrictions with respect to the actions that may be triggered when the condition specified in the if clause 310 of the conditional action rule is satisfied. For example, the rule scenario controller 140 may restrict the actions that may be triggered by at least limiting the selection of available actions for constructing the then clause 320 of the conditional action rule. The selection of available actions may exclude impermissible actions, which may be determined based on a plurality of factors including, for example, the access restrictions associated with the data objects affected by the rule, one or more attributes of the actions, and/or the like. For instance, the actions SET, CREATE, and/or DELETE may be unavailable for the original "Position" data object due to the original "Position" data object being read-only. As such, the selection of available actions for construction the then clause 320 of the conditional action rule may exclude the actions SET, CREATE, and/or DELETE to at least prevent the first client 135A from defining rule that triggers an action to set, create, and/or delete an original "Position" data object. Alternatively and/or additionally, the action RAISE MESSAGE may only be available for messages exceeding a threshold severity level (e.g., INFO messages and WARNING messages but not ERROR messages).

The first client 135A may also define, via the user interface 300, the rule as a condition rule that returns a Boolean value based on the status of a data object affected by the rule. To further illustrate, FIG. 3B depicts an example of the user interface 300 configured to receive inputs for defining a condition rule. It should be appreciated that a condition rule may determine the status of a data object, for example, by evaluating a specified condition. However, instead of triggering an action based on the status of the data object, the condition rule may return a Boolean value.

Referring again to FIG. 3B, the user interface 300 may include one or more input fields for constructing a condition 330 for the condition rule. As shown in FIG. 3B, the first client 135A may specify a condition for the full time equivalent (FTE) value of a newly created position data object to be equal to a decimal value of 1. The application 110 applying the condition rule may evaluate the condition 330 to determine whether the full time equivalent (FTE) value of a newly created position data object is equal to a decimal value of 1. The application 110 may further return a Boolean value (e.g., true and/or false) based at least on the evaluation of the condition 330. As noted, the selection of inputs available for constructing the condition 330 may be determined based on the data objects affected by the rule including, for example, values and/or the data types of the values in the new "Position" data object, the original "Position" data object, and/or the like. Furthermore, the Boolean value returned as a result of evaluating the condition 330 may serve as an input to the same and/or different data processing functionality being performed by the application 110.

In some example embodiments, a rule scenario may be implemented as a JAVA class, which may include the logic associated with the rule scenario including, for example, data objects, restrictions, and/or the like. Alternatively and/or additionally, a rule scenario may be an instance of a rule scenario data object stored, for example, in the database 145 coupled with the rule scenario controller 140. As such, the rule scenario controller 140 may respond to the selection of the rule scenario 210, for example, via the user interface 210, by at least querying the database 145 to retrieve the corresponding rule scenario data object. The rule scenario data object corresponding to the rule scenario 210 may include the data objects that may be affected by a rule defined in accordance with the rule scenario 210. Alternatively and/or additionally, the rule scenario data object corresponding to the rule scenario 210 may include the actions that may be triggered by a rule defined in accordance with the rule scenario 210. The rule scenario controller 140 may generate, based at least on the rule scenario data object corresponding to the rule scenario 210, the user interface 200 and/or the user interface 300. For example, the selection of inputs provided by the user interface 200 and/or the user interface 300 may be determined based at least on the rule scenario data object corresponding to the rule scenario 210.

To further illustrate, Table 1 below depicts an example of programming code implementing a rule scenario such as, for example, the rule scenario 210.

TABLE 1

```
@RuleScenarioImplementation(code = "MDF_STDMAINTENANCE",
categoryCode = "MDF", labelKey =
"MDF_STDMAINTENANCE_LABEL", descriptionKey =
"MDF_STDMAINTENANCE_DESCRIPTION", order = 1)
class MDFStandardMaintenanceRuleScenario extends
AbstractRuleScenario {
    @Override
    List getScenarioAttributes( ) {
        Create new list R
        Add new scenario attribute "Generic Object" to R
        Add new scenario attribute "Event" to R
        Return R
    }
    @Override
    List getScenarioAttributeOptionValues(scenarioAttributeName) {
        Create new list R
        If scenarioAttributeName is "Generic Object" Then
            Add new option "Absence" to R
            Add new option "Position" to R
            Add new option "Benefit" to R
            Add new option "Time Sheet" to R
            ...
        Else If scenarioAttributeName is "Event" Then
            Add new option "onInit" to R
            Add new option "onChange" to R
```

TABLE 1-continued

```
            Add new option "onSave" to R
        End If
        Return R
    }
    @Override
    Boolean isActive( ) {
        If module "MDF" is enabled Then
            Return true
        Else
            Return false
        End If
    }
    @Override
    List getRuleParameters(scenarioAttributeValues) {
        Create new list R
        Set variable E to scenarioAttributeValues["Event"]
        Set variable T to type of scenarioAttributeValues["Generic
        Object"]
        Add new editable parameter of type T to R
        If E is "onChange" or "onSave" Then
            Add new read-only parameter with suffix "(Original
            Values)" of type T to R
        End If
        Return R
    }
    @Override
    Boolean isConditionRule( ) {
        Return false
    }
    @Override
    Boolean supportsAlwaysTrue(scenarioAttributeValues) {
        Set variable E to scenarioAttributeValues["Event"]
        If E is "onInit" or "onSave" Then
            Return true
        Else
            Return false
        End If
    }
    @Override
    Severity getHighestRaiseMessageSeverity(scenarioAttributeValues) {
        Set variable E to scenarioAttributeValues["Event"]
        If E is "onInit" Then
            Return "INFO"
        Else
            Return "ERROR"
        End If
    }
}
```

Figure 4:
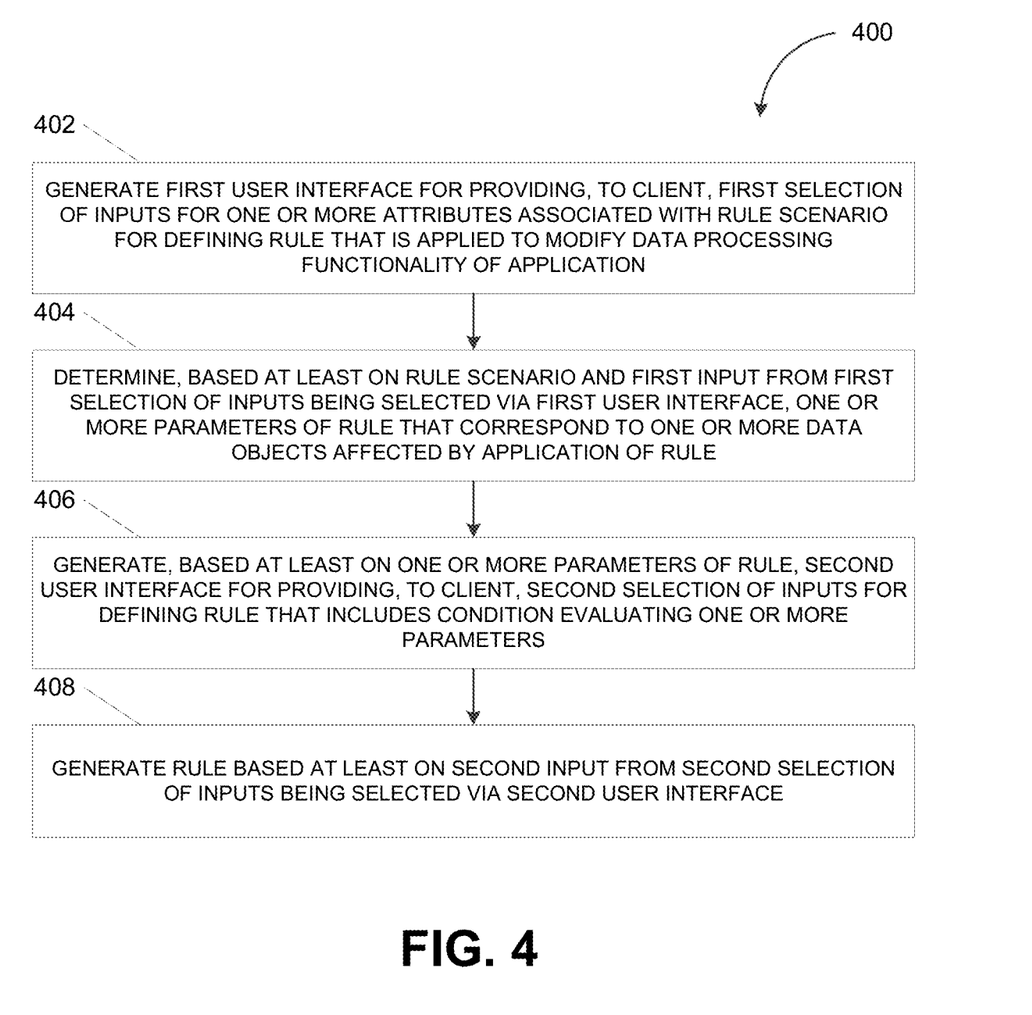
FIG. 4 depicts a flowchart illustrating a process for defining a rule based on a rule scenario, in accordance with some example embodiments.

FIG. 4 depicts a flowchart illustrating a process 400 for defining a rule based on a rule scenario, in accordance with some example embodiments. Referring to FIGS. 1-2, 3A-B, and 4, the process 400 can be performed by the rule scenario controller 140. In some implementations of the current subject matter, the process 400 can be performed in order to provide a rule scenario framework for a tenant to define a rule, which may be applied by the application 110 to modify a data processing functionality of the application 110 to accommodate tenant specific use cases. Under the rule scenario framework, the rule may be defined in accordance with a rule scenario, which may impose one or more restrictions on the scope of the rule including, for example, the data objects affected by the rule, the actions triggered by the rule, and/or the like.

At 402, the rule scenario controller 140 may generate a first user interface for providing, to a client, a first selection of inputs for one or more attributes associated with a rule scenario for defining a rule that is applied to modify a data processing functionality of an application. For example, in some example embodiments, the rule scenario controller 140 may generate the user interface 200. As shown in FIG. 2, the user interface 200 may include a selection of rule scenarios including, for example, the rule scenario 210. The first client 135A may define a rule by at least selecting, for example, the rule scenario 210 from the selection of rule scenarios displayed in the user interface 200. In doing so, the first client 135A may indicate a wish to define a rule in accordance with the rule scenario 210 for "Standard Maintenance of MDF Objects." Accordingly, the user interface 200 may be updated, in response to the selection of the rule scenario 210, to include a selection of inputs for the first attribute 220A and/or the second attribute 220B of the rule scenario 210. The first attribute 220A may correspond to one or more data objects affected by the rule defined in accordance with the rule scenario 210 while the second attribute 220B may correspond to events that trigger the rule defined in accordance with the rule scenario 210.

At 404, the rule scenario controller 140 may determine, based at least on the rule scenario and a first input from the first selection of inputs being selected via the first user interface, one or more parameters of the rule that correspond to one or more data objects affected by the application of the rule. For example, the first client 135A may have selected, via the user interface 200, the "Position" data object as being affected by the rule defined in accordance with the rule scenario 210. Alternatively and/or additionally, the first client 135A may have selected, via the user interface 200, the "onChange" event as being a trigger for the application of the rule defined in accordance with the rule scenario 210. In doing so, the first client 135A may further indicate a wish to define a rule that is applied in response to a change in the "Position" data object.

Referring to FIGS. 3A-B, the selection of the "Position" data object and/or the "onChange" event may determine the parameters of a rule defined in accordance with the rule scenario 210. As noted, the parameters of a rule may correspond to data objects affected by the application of the rule. Alternatively and/or additionally, the selection of the "Position" data object and/or the "onChange" event may determine metadata associated with the parameters of the rule, which is displayed alongside the parameters of the rule in the user interface 300. The parameters of the rule and/or the metadata associated with the parameters of the rule may be determined based on the rule scenario 210. In some example embodiments, the metadata associated with the parameters of the rule may include, for example, restrictions on access to the corresponding data objects. For instance, as shown in FIGS. 3A-B, the new "Position" data object may be editable but the original "Position" data object may be read-only. Based on these access restrictions, the application 110 applying the rule defined in accordance with the rule scenario 210 may change the values in the new "Position" data object but not the values in the original "Position" data object.

At 406, the rule scenario controller 140 may generate, based at least on the one or more parameters of the rule, a second user interface for providing, to the client, a second selection of inputs for defining the rule that includes a condition evaluating the one or more parameters. As shown in FIGS. 3A-B, the rule scenario controller 140 may generate the user interface 300 to include one or more input fields for constructing a condition and/or an action associated with a rule defined in accordance with the rule scenario 210. For example, FIG. 3A depicts an example of the user interface 300 configured to receive inputs for defining a conditional action rule, which may be a type of rule that triggers an action based on the status of the data objects affected by the rule. To enable the definition of a conditional action rule, the user interface 300 may include one or more input fields for constructing the clauses of the conditional action rule including, for example, the if clause 310, the then clause 320, and/or the like. It should be appreciated that the if clause 310 of the conditional action rule may specify a condition for triggering the action specified in the then clause of the conditional action rule. For instance, as shown in FIG. 3A, the if clause 310 of the conditional action rule may specify a condition for the full time equivalent (FTE) value of a new position data object to equal to 1 while the then clause 320 of the conditional action rule may specify an action that is performed when that condition is met. The application 110 applying the conditional action rule may evaluate the condition specified in the if cause 310 and perform the action specified in the then clause 320 based on the evaluation of the condition.

Alternatively and/or additionally, as shown in FIG. 3B, the user interface 300 may also be configured to receive inputs for defining a condition rule that returns a Boolean value (e.g., true and/or false) based on the status of the data objects affected by the rule. For example, as shown in FIG. 3B, the first client 135A may specify a condition for the full time equivalent (FTE) value of a new position data object to be equal to a decimal value of 1. The application 110 applying the condition rule may evaluate the condition 330 and return a Boolean value based on whether the full time equivalent (FTE) value of a new position data object is equal to a decimal value of 1.

At 408, the rule scenario controller 140 may generate, based at least on a second input from the second selection of inputs being selected via the second user interface, the rule. For example, in some example embodiments, the rule scenario controller 140 may generate the rule, which may have been defined in accordance with the rule scenario 210. The rule may be applied by the application 110 when the application 110 is performing a data processing functionality including, for example, payroll, time and attendance management, recruiting and onboarding, learning and development, performance and compensation, workforce planning, and/or the like. For example, the application 110 may apply the rule in response to the second client 135B invoking the data processing functionality. As noted, the application 110 may operate on one or more data objects stored in the database 115 when performing the data processing functionality. Applying the rule may modify the data processing functionality to accommodate uses cases that are specific to the tenant 130.

According to some example embodiments, defining the rule in accordance with the rule scenario 210 may prevent the definition of a defective rule that affects impermissible data objects, triggers impermissible actions, and/or the like. As such, the application 110 may apply the rule defined in accordance with the rule scenario 210 without encountering any unexpected and/or unresolvable errors.

Figure 5:
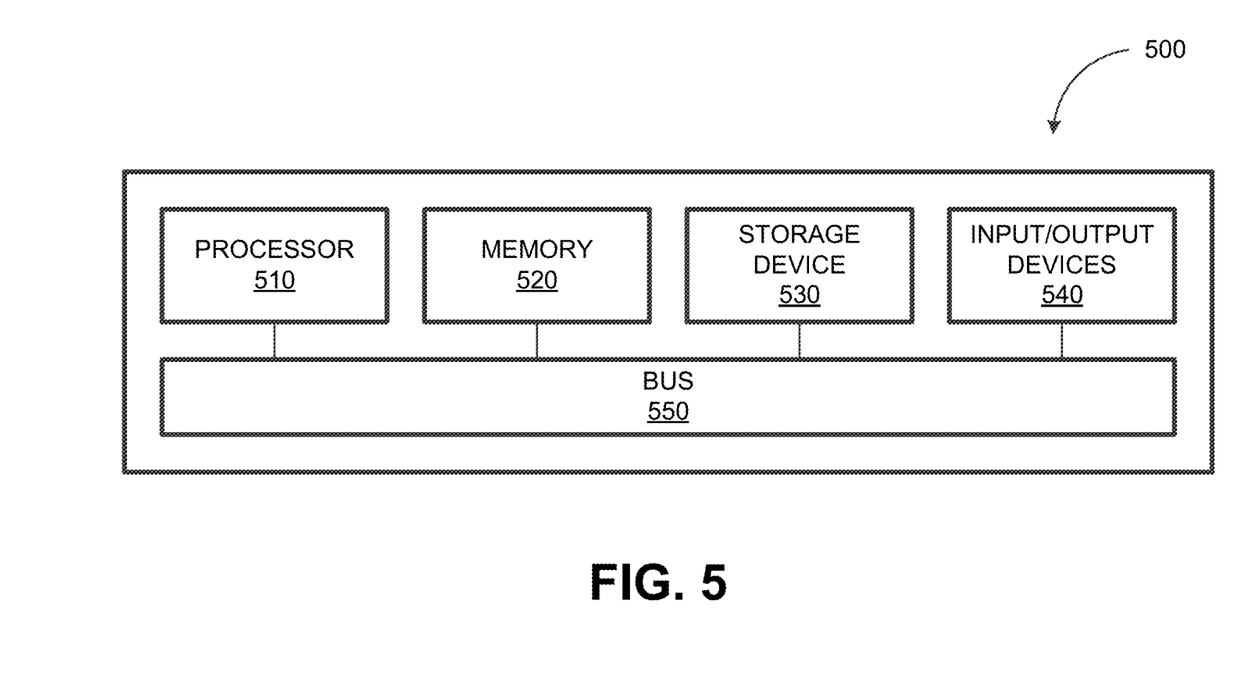
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1-2 and 5, the computing system 500 can be used to implement the rule scenario controller 140 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the rule scenario controller 140. In some example embodiments, the processor 510 can be a single-threaded processor. Alternately, the processor 510 can be a multithreaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      generating a first user interface for displaying, at a client device, a plurality of rule scenarios including a first rule scenario for defining a first rule and a second rule scenario for defining a second rule, the first rule and the second rule being applied by an application accessible to multiple tenants, the first rule being applied by the application to effect a tenant-specific modification to a first data processing functionality of the application, the second rule being applied by the application to effect the tenant-specific modification to a second data processing functionality of the application, the application operating on one or more data objects stored in a database in order to perform the first data processing functionality and the second data processing functionality, the application being accessible from multiple client devices associated with a tenant such that a rule defined via a first client device associated with the tenant is applied when a second client device associated with the tenant invokes a corresponding data processing functionality of the application;
      in response to receiving, via the first user interface, one or more inputs selecting the first rule scenario, generating a second user interface for providing, at the client device, a first selection of inputs for one or more attributes of the first rule scenario;
      determining, based at least on the first rule scenario and a first input from the first selection of inputs being selected via the second user interface, one or more parameters of the first rule, the one or more parameters of the first rule corresponding to at least one data object affected by the application of the first rule;
      generating, based at least on the one or more parameters of the first rule, a third user interface for providing, to the client device, a second selection of inputs for defining a condition of the first rule, the condition of the rule evaluating the one or more parameters of the first rule; and
      generating, based at least on a second input from the second selection of inputs being selected via the third user interface, the first rule.

2. The system of claim 1, wherein the application of the first rule returns a Boolean value determined based at least on the evaluation of the one or more parameters of the first rule.

3. The system of claim 1, wherein the first selection of inputs and the second selection of inputs are determined based at least on the first rule scenario, and wherein the first selection of inputs and the second selection of inputs exclude impermissible data objects that are not permitted to be affected by the application of the first rule.

4. The system of claim 1, wherein the third user interface further provides, to the client device, a third selection of inputs for defining an action that is triggered based at least on the evaluation of the one or more parameters of the first rule.

5. The system of claim 4, wherein the third selection of inputs is determined based at least on the first rule scenario and/or the first selection of inputs, and wherein the third selection of inputs excludes impermissible actions that are not permitted to be performed on the at least one data object corresponding to the one or more parameters of the first rule.

6. The system of claim 5, wherein the impermissible actions are determined based on restrictions on a reading of values and/or a writing of values from the at least one data object corresponding to the one or more parameters of the first rule.

7. The system of claim 1, wherein the application of the first rule modifies the first data processing functionality of the application in accordance with a use case associated with the client device.

8. The system of claim 1, wherein the application comprises a cloud-based service, and wherein the client device accesses the first data processing functionality and/or the second data processing functionality of the application remotely.

9. A computer-implemented method, comprising:
   generating a first user interface for displaying, at a client device, a plurality of rule scenarios including a first rule scenario for defining a first rule and a second rule scenario for defining a second rule, the first rule and the second rule being applied by an application accessible to multiple tenants, the first rule being applied by the application to effect a tenant-specific modification to a first data processing functionality of the application, the second rule being applied by the application to effect the tenant-specific modification to a second data processing functionality of the application, the application operating on one or more data objects stored in a database in order to perform the first data processing functionality and the second data processing functionality, the application being accessible from multiple client devices associated with a tenant such that a rule defined via a first client device associated with the tenant is applied when a second client device associated with the tenant invokes a corresponding data processing functionality of the application;
   in response to receiving, via the first user interface, one or more inputs selecting the first rule scenario, generating a second user interface for providing, at the client device, a first selection of inputs for one or more attributes of the first rule scenario;
   determining, based at least on the first rule scenario and a first input from the first selection of inputs being selected via the second user interface, one or more parameters of the first rule, the one or more parameters of the first rule corresponding to at least one data object affected by the application of the first rule;
   generating, based at least on the one or more parameters of the first rule, a third user interface for providing, to the client device, a second selection of inputs for defining a condition of the first rule, the condition of the rule evaluating the one or more parameters of the first rule; and generating, based at least on a second input from the second selection of inputs being selected via the third user interface, the first rule.

10. The method of claim 9, wherein the application of the first rule returns a Boolean value determined based at least on the evaluation of the one or more parameters of the first rule.

11. The method of claim 9, wherein the first selection of inputs and the second selection of inputs are determined based at least on the first rule scenario, and wherein the first selection of inputs and the second selection of inputs exclude impermissible data objects that are not permitted to be affected by the application of the first rule.

12. The method of claim 9, wherein the third user interface further provides, to the client, a third selection of inputs for defining an action that is triggered based at least on the evaluation of the one or more parameters of the first rule.

13. The method of claim 12, wherein the third selection of inputs is determined based at least on the first rule scenario and/or the first selection of inputs, and wherein the third selection of inputs excludes impermissible actions that are not permitted to be performed on the at least one data object corresponding to the one or more parameters of the first rule.

14. The method of claim 13, wherein the impermissible actions are determined based on restrictions on a reading of values and/or a writing of values from the at least one data object corresponding to the one or more parameters of the first rule.

15. The method of claim 9, wherein the application of the first rule modifies the first data processing functionality of the application in accordance with a use case associated with the client device.

16. The method of claim 9, wherein the application comprises a cloud-based service, and wherein the client device accesses the first data processing functionality and/or the second data processing functionality of the application remotely.

17. A non-transitory computer readable medium storing instructions which, when executed by at least one data processor, result in operations comprising:
    generating a first user interface for displaying, at a client device, a plurality of rule scenarios including a first rule scenario for defining a first rule and a second rule scenario for defining a second rule, the first rule and the second rule being applied by an application accessible to multiple tenants, the first rule being applied by the application to effect a tenant-specific modification to a first data processing functionality of the application, the second rule being applied by the application to effect the tenant-specific modification to a second data processing functionality of the application, the application operating on one or more data objects stored in a database in order to perform the first data processing functionality and the second data processing functionality, the application being accessible from multiple client devices associated with a tenant such that a rule defined via a first client device associated with the tenant is applied when a second client device associated with the tenant invokes a corresponding data processing functionality of the application;
    in response to receiving, via the first user interface, one or more inputs selecting the first rule scenario, generating a second user interface for providing, at the client device, a first selection of inputs for one or more attributes of the first rule scenario;
    determining, based at least on the first rule scenario and a first input from the first selection of inputs being selected via the second user interface, one or more parameters of the first rule, the one or more parameters of the first rule corresponding to at least one data object affected by the application of the first rule;
    generating, based at least on the one or more parameters of the first rule, a third user interface for providing, to the client device, a second selection of inputs for defining a condition of the first rule, the condition of the rule evaluating the one or more parameters of the first rule; and
    generating, based at least on a second input from the second selection of inputs being selected via the third user interface, the first rule.

18. The system of claim 1, wherein the first data processing functionality and the second data processing functionality each comprise a different one of a payroll, time and attendance management, recruiting and onboarding, learning and development, performance and compensation, and workforce planning.

* * * * *